US008527905B2

(12) United States Patent
Chen et al.

(10) Patent No.: US 8,527,905 B2
(45) Date of Patent: Sep. 3, 2013

(54) PROVIDING ARCHIVED WEB PAGE CONTENT IN PLACE OF CURRENT WEB PAGE CONTENT

(75) Inventors: Yen-Fu Chen, Austin, TX (US); Fabian F. Morgan, Austin, TX (US); Keith R. Walker, Austin, TX (US)

(73) Assignee: International Business Machines Corporsation, Armonk, NY (US)

( * ) Notice: Subject to any disclaimer, the term of this patent is extended or adjusted under 35 U.S.C. 154(b) by 600 days.

(21) Appl. No.: 11/422,694

(22) Filed: Jun. 7, 2006

(65) Prior Publication Data
US 2007/0288589 A1 Dec. 13, 2007

(51) Int. Cl.
*G06F 3/048* (2013.01)
*G06F 17/00* (2006.01)
*G06F 15/16* (2006.01)

(52) U.S. Cl.
USPC ........... 715/853; 715/205; 715/206; 709/217; 709/219

(58) Field of Classification Search
USPC ................ 715/853, 205, 206; 709/712, 719, 709/217, 219
See application file for complete search history.

(56) References Cited

U.S. PATENT DOCUMENTS

| | | | | |
|---|---|---|---|---|
| 5,794,259 | A | * | 8/1998 | Kikinis .......................... 715/207 |
| 5,978,842 | A | * | 11/1999 | Noble et al. ................... 709/218 |
| 6,029,175 | A | | 2/2000 | Chow et al. |
| 6,157,930 | A | * | 12/2000 | Ballard et al. ......................... 1/1 |
| 6,349,326 | B1 | | 2/2002 | Lam |
| 6,405,223 | B1 | * | 6/2002 | Kelley et al. ................... 715/205 |
| 6,880,124 | B1 | * | 4/2005 | Moore ........................... 715/210 |
| 6,931,439 | B1 | | 8/2005 | Hanmann et al. |
| 7,395,315 | B2 | * | 7/2008 | Colson et al. .................. 709/206 |
| 2003/0101234 | A1 | * | 5/2003 | McBrearty et al. ........... 709/218 |
| 2004/0267702 | A1 | | 12/2004 | Gallant et al. |
| 2005/0097160 | A1 | * | 5/2005 | Stob .............................. 709/200 |
| 2005/0108259 | A1 | * | 5/2005 | Watanabe et al. ............. 707/100 |
| 2005/0114782 | A1 | | 5/2005 | Klinger |
| 2006/0168510 | A1 | * | 7/2006 | Bryar et al. .................... 715/511 |
| 2007/0124693 | A1 | * | 5/2007 | Dominowska et al. ........ 715/772 |

OTHER PUBLICATIONS

Thomas McGuire "Internet Explorer 6 and Outlook Express tweak Guide" Mar. 21, 2005.*
Wikipedia "Help:Page History" Revision page dated Sep. 20, 2004.*
Development Review Application Form Instructions, Adobe Acrobat http://web.archive.org/web/20011120175948/http://www.mncppc.org/drd/devinstruct.htm.*
PCMAG.com Encyclopedia definetion for browser cache accesed from archive.org archived Apr. 24, 2006.*

* cited by examiner

*Primary Examiner* — William Bashore
*Assistant Examiner* — Andrea Long
(74) *Attorney, Agent, or Firm* — Shumaker & Sieffert, P.A.

(57) ABSTRACT

In accordance with the present disclosure a user can return to a previously viewed/archived version of a web-page when the content of the currently available webpage is different from the archived content. To facilitate such an interaction, a browser can archive displayed versions of web pages and their network address and when a user makes new request for the web page, the browser can determine that there is an archived version with the requested network address. When an archived version of the web page exists, the browser can prompt the user to determine if the user wants to "re-display" the contents of a previously displayed web page or if the user wants to display the current contents provided by the website server.

21 Claims, 5 Drawing Sheets

PROVIDING ARCHIVED WEB PAGE CONTENT IN PLACE OF CURRENT WEB PAGE CONTENT

FIELD OF INVENTION

The present disclosure is in the field of data retrieval and, in particular, to systems, methods and media that allow a user to select between current and archived content in a content retrieval environment.

BACKGROUND

Personal computer (PC) systems are well known in the art. They have attained widespread use for providing computing power to many segments of today's modern society. Also, mobile computing devices, such as notebook PCs, personal digital assistants (PDAs), sophisticated wireless phones, etc., have also achieved widespread usage. The widespread use of such devices in various segments of society has resulted in a reliance on computer systems both at work and at home to facilitate functions such as for obtaining news and stock market information, buying, selling, trading, banking, shopping, shipping, submitting information and communication generally in the form of hypertext transfer protocol (http) and e-mail, as well as other communication formats and services. Many of these functions take advantage of the communication abilities offered by the Internet or other networks, such as local area networks.

One feature that has become important to many is receiving news over the Internet or getting news "on-line" utilizing a computing device having a browser to access Internet based news services. Generally, a consumer can utilize a browser or other interface on their communication device to preview a series of headlines on a web page wherein the webpage typically provides selectable links, that when selected, allow a browser to download news articles. For example, a user may visit a news service such as Reuters, CNN or ABC or just a local news service provided by a small local media company by using a keyword search or by utilizing a network address. Websites such as those provided by the news services mentioned above will typically have a "title page" with selectable links, commonly referred to as a front page. The front page will typically have supporting pages, that can be retrieved when an appropriate link on the front page is selected by the user.

The content and links provided by such services continually change as new events unfold and new articles are written. Front pages have a limited amount of space and thus, as new material or news becomes available, content stored at a server of the website will be automatically refreshed and links to new content will replace links to old or outdated content. For example, assume that there are six different headlines displayed on a website of a news service, wherein each headline is further explained by a brief written paragraph and a selectable link provides access to the "full story." Selection of the link will cause the users computer to download and display the "full story" related to the headline. It is a common occurrence for the user to select a link and retrieve, display and read an entire article. After the story is read, a user will typically press a "back" button of the browser and accordingly the browser will "re-retrieve" or redisplay the front page of the web-site.

Many news services are very dynamic and after downloading and reading a full story, the headlines, and the links that were originally provided on the front page and displayed to the user may have been replaced with new content and new links at the server. If a user desires to show the full story to someone else such as another family member at a later date, the headline and the link may have disappeared from the web page. In such a situation, it can be very difficult, if not impossible for a user to locate and retrieve the article, because the link cannot be found. This is true even though article is still stored on a server somewhere and will probably be available for an extended period of time, possibly years.

In another situation, a user of the news services may start reading the headlines and be interrupted by a phone call or some other distraction and when the user returns to the computer and attempts to retrieve the original website, the content or the link on the web site may be missing due to the dynamic nature of the website. Once again, it becomes a burden to locate the desired information. Generally, in all of these instances, the content is typically still available somewhere online, but locating the content or the link to the content is not an intuitive process.

Another common phenomenon that often leads to "loss of data" includes filling out a form "submitable" on-line. Filling out forms that are retrieved online is common among computer users and is commonly performed when, for example making car, airline, or hotel reservations, ordering goods, paying bills and requesting services or applying for a job. After the form is filled out, or partially filled out, the form can be submitted by selecting a "submit" button in a user-browser interaction. Often such information is "lost" when a user submits the completed form on-line and a blank form appears next on the user's computer display.

A common occurrence when submitting information online, is that a message will be sent back to the user stating that the form was incorrectly filled out or a form processing server was unable to process the form submission wherein the blanked form thereafter appears to the user. In this process, it is common that lengthy entries have been made by the user and in the submission process the user entries are instantaneously deleted. This can be particularly frustrating when the form is long, and tedious to fill out often requiring the user to look up data while making the entries.

One common reaction for a frustrated user is to press a "Back" button provided by the browser which typically will not redisplay what was submitted. Often this is a built in feature to address security concerns. Thus, hours worth of work can be erased instantaneously. There is, therefore, a need for an efficient and effective system to archive information, data and links that can be lost or periodically changes.

SUMMARY OF THE INVENTION

The problems identified above are in large part addressed by systems, methods and media for archiving web page content such that when the content of a web page has changed, a user can recall an archived copy of the web page and view such archived content. A user can be prompted by a browser to determine if the user wants to display archived contents or contents of a previously displayed web page when a browser determines that the contents of the web page on a server have changed from a previous version or the current download has different content than the previous download. Thus, the browser can be aware of the current and past versions of web pages retrieved in a user-browser interaction and prompt a user to determine what version of a web page the user wants to view. If a web page has been updated on a server and its content has changed, the user can be given the option of displaying a sequence of older versions of the web page which can be archived locally by the browser. To accomplish this, a user can download a web page via some form of user-browser interaction. Upon the user exiting the web-page, a copy of the address and the contents of the web page can be automatically stored locally. When the user attempts to download content from the same network address at a later date, the browser can determine if the content has changes and give the user the option to view the archived version of the web page or the current content of the web page.

Embodiments may include a method for providing archived content to a user by displaying content received in a first download, archiving at least a portion of the content locally, receiving a second download having different content and determining if the user wants to display the current download or the archived content. The method can also include comparing the network address and the content of the archived web page with an address and content for a current download and requesting and prompting the user for a user selection when there is a difference between the archived content and the current content having the same network address.

The method can also include displaying the contents of the first download when the user wants to display the contents of the first download and displaying the contents of the second download when the user wants to view the contents of the second download. The method can further include a dynamic list of archived web pages that purges the oldest archives as new web pages are archived and an option to place archived contents in a permanent archive in response to user input.

In another embodiment, a user can fill out fields in a downloaded form. If blank fields are returned to the user's computer after a submission of the form, the user can select an archived version of the form (a form containing previously entered data) which was saved as part of the form submission process. The storing or archiving of the user entered content can also be performed responsive to an activation of a "back" instruction, a "forward" instruction or a "submit" instruction in the user-browser interaction. Thus, the browser can provide a "stateful" environment wherein the browser can keep track of the state of user interactions, by setting values in a storage field to follow user actions, to query the user to display archive data, links and web pages according to the user-browser interactions.

In yet another embodiment, a machine-accessible medium is disclosed containing instructions effective, when executing in a data processing system, to make the data processing system perform operations. Such operations can include displaying content received in a first download, storing at least a portion of the content locally, receiving a second download having at least some content that is different than the content of the first download, and querying the user to determine if the user wants to display the content of the first download instead of the content of the second download. The medium can also provide instructions to compare the contents of the first download to the contents of the second download and determine what differences exist between the content of the first download and the content of the second download.

In another embodiment, an archiving system is provided that has a graphical user interface to display downloaded information and to facilitate the download of additional information, an archiving application to store the downloaded information locally, and a comparator application to compare the displayed information with the additional information to determine if the displayed information is different than the additional information. A user can select to display the downloaded information and/or the additional information on the graphical user interface.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally, systems, methods and media are provided herein that allow a user to return to a previously viewed version of a web-page in a browser environment. Thus a user can "re-display" a previously displayed web page when the current content of a web page is different than the previously displayed version of the web page. The browser can be aware of the past and current states of the browser based on the user-browser interaction. If a web page has been updated on a server and its content has changed, the user can be given the option of displaying the older version or the locally archived version of the web-page or displaying the current download. To accomplish this, a user may download a web page via some form of user-browser interaction and when the user exits the web-page, a copy of the web page address, the contents of the web page and possibly the HTML code of the webpage can be automatically stored locally.

In one embodiment web page data can be cached in an Internet cache directory of the user machine. When the user retrieves a web page from a server using a network address that matches an archived network address, possibly by selection of a back, forward, or favorites button, the browser can compare the archived network address with the requested address and if a network address of the requested web page is archived, the contents of the retrieved page can be compared with the contents of the archived page. When the contents of the pages differ, the user can be notified and given a chance to view the archived web page or the current content stored by the server. This feature is particularly useful for a web address that supports news services having selectable links that can be utilized to retrieve news articles from servers wherein the headlines and links provided by such a web sites continually change and become inaccessible over time.

While specific embodiments will be described below with reference to particular configurations of hardware and/or software, those of skill in the art will realize that embodiments of the present invention may advantageously be implemented with other equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Figure 1:
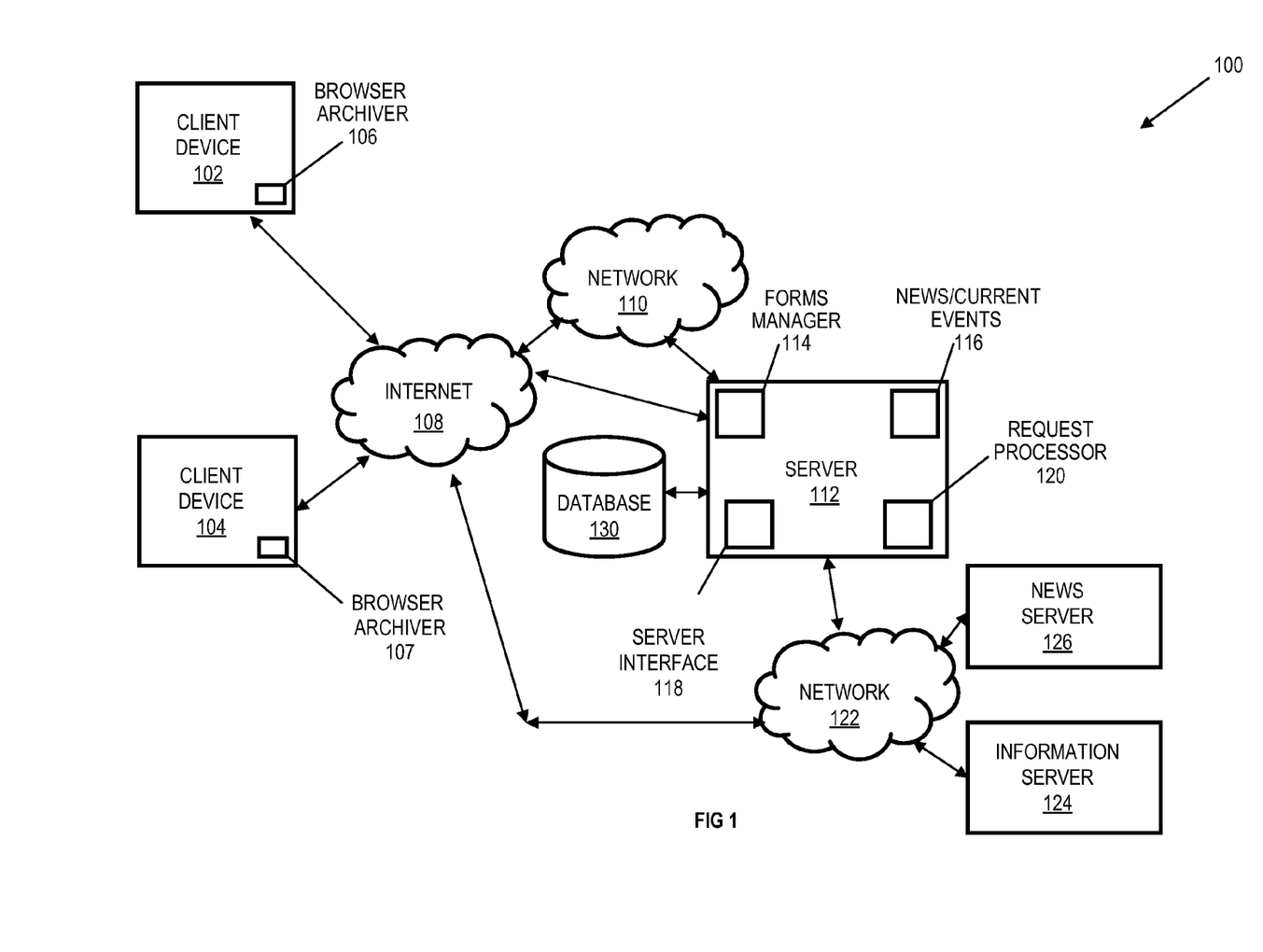
FIG. 1 depicts a client-server environment for a local archive system with an application server and client stations.

Referring to FIG. 1, a client-server wide area network configuration 100 is illustrated. The configuration 100 can include client devices 102 and 104, wherein the client devices 102 and 104 can have browser/archivers 106 and 107 respectively. Clients 102 and 104, via a wide area network such as the Internet 108, can achieve a connection to other networks such as network 110 and to servers such as server 112. Server 112 can achieve a connection to database 130 and to other networks such as network 122. Server 112 can include a forms manager 114, a news and current events service (providing a web page) 116, a server interface 118, and a request processor 120. Network 122 can achieve connectivity to another news server 126, and another information or content server 124 such that many different articles provided by servers can be located by client device 102 via selectable links having network addresses.

The browser/archivers 106 and 107 can facilitate user-browser interactions to communicate between the client devices 102 and 104 and the server 112. In some embodiments, the browser/archiver 106 may be enabled with computer executable code such as JavaScript™ (of Sun Microsystems, Inc.) or other code that enables transmission of interaction details from the client device 102 to servers 112, 124, and 126. JavaScript™ is a system of programming codes that can be embedded in Hypertext Markup Language (HTML) language or other language of a page to provide additional functionality and is generally supported by browser/archiver 106. In these embodiments, the client software may be included as JavaScript™ on every web page sent by the servers 112, 124 and 126.

The JavaScript™ code may track details of the user's interaction with the browser/archiver 106 and may transmit an indication of such interaction (as part of the user-browser interaction data) to the server 112. While JavaScript™ is mentioned herein other scripting languages or methodologies may also be utilized to facilitate operation of the disclosed system. Such tracked details of the user-server interaction can be utilized to control the menu-driven aspects of the browser functions described herein.

In operation, when a user utilizing client device 102, possibly a personal computer, wants to see news or wants to fill out a form, the user via the browser/archiver 106 can transmit a network address of a web page stored on server 112. The web page content stored in the database 130 may be retrieved by the browser/archiver 106. In one embodiment, the user can request a form and forms manager 114 can locate such a form based on user input to the browser. In turn the browser/archiver 106 can display the requested information to the user and create an archive copy of the server address, and the contents of the retrieved web page. In accordance with the present disclosure, the browser/archiver 106 can archive certain displayed web pages and when a user requests a current webpage from the server 112 that is different than the content of the associated archived web page, the browser/archiver 106 can allow the user to display the archived version of the webpage instead of the version that is currently stored by the sever 112.

In one embodiment the browser/archiver 106 could retrieve current content as provided by a server 112 in response to a user request. The server 112 could provide an indicator that archived content exists and in response the browser/archiver 106 could query the user to determine whether the user wants to display archived content. This feature could be activated only if the archived content was previously downloaded by the user.

Thus, a compare function can be performed to compare the content of the first download to the content of the second download to determine if there is at least some difference between the content of the downloads. Based on any identified difference, the user can be queried to determine whether the user wants to display the first content or the second content. This feature is useful because old versions of web pages are typically not available to users via servers such as server 112.

Generally, written content stored in a database 130 or in information server 124 can be located via selectable links. Although the selectable links on a news web page may come and go, the actual text of the article will typically remain stored in the database 130 or on the information server 124 and the same link will often remain functional for extended periods of time. In fact, the links provided by an archived web page may be valid for years.

In another embodiment, the content could be a form retrieved from forms manager 114 and the browser/archiver 106 can store a "filled out" form prior to its submission to the forms manager 114. When the forms manager 114 determines that the form was not properly filled out the forms manager 114 often erases the data that was entered by the user, by simply providing another download of the blank form. The new download can trigger the browser/archiver 106 to compare the stored version (the submitted version) with the second download and prompt the user for the version of the download the user wants to view. In yet another embodiment, the forms manager 114 can provide the compare and prompt functions as described above with respect to the browser archiver 106.

Figure 2:
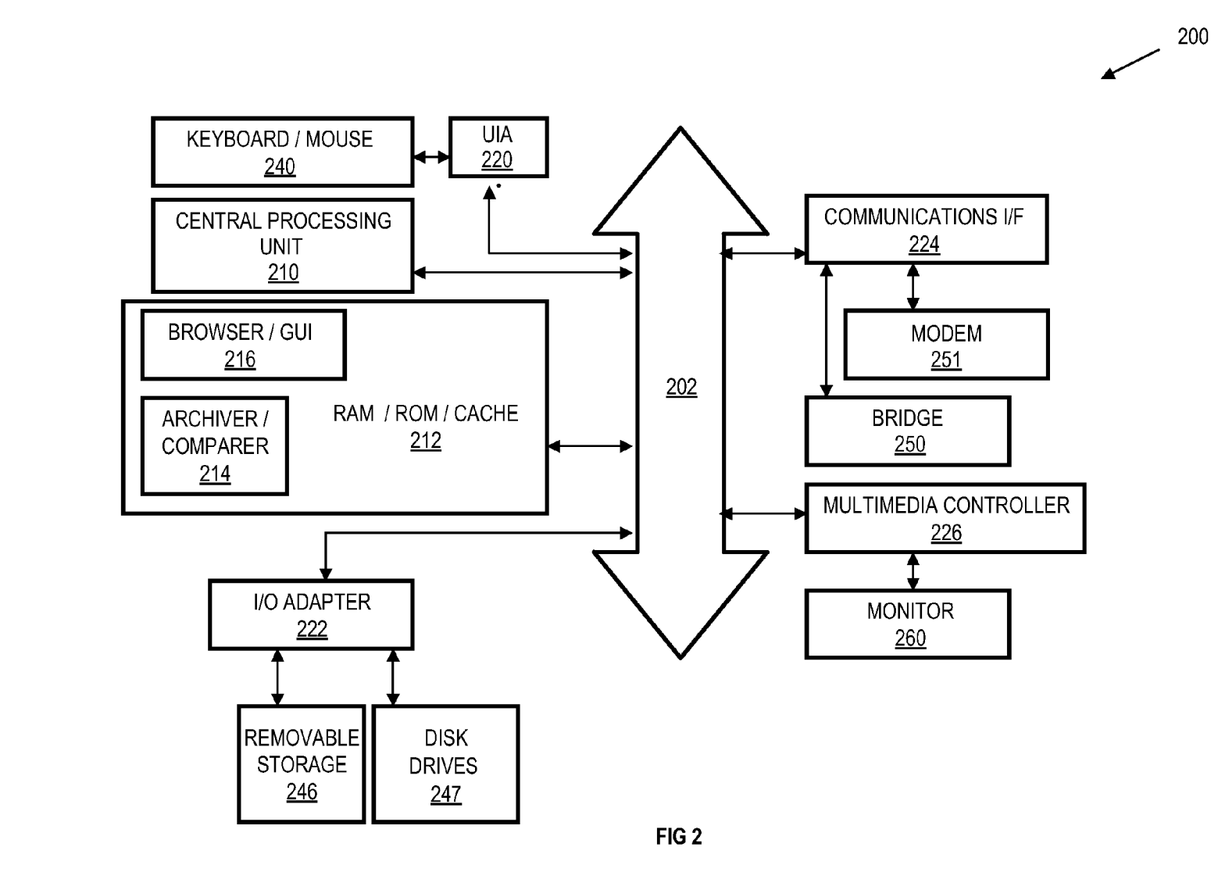
FIG. 2 depicts a block diagram of one embodiment of a computer system suitable for use as a component of the archive system disclosed herein.

FIG. 2 provides, in a block diagram format, a processing device 200 such as a personal computer system. The processing device 200 could be utilized to provide the browser/archiver systems and methods described herein. Such a device 200 could execute an entire suite of computer programs that can assist a user in locating articles on remotely located servers and can assist a user in filling out and submitting forms to servers. Although a personal computer platform that can access networks is described herein, workstations and mainframe platforms, radiotelephones, PDAs, or other operating systems, environments or platforms would not part from the scope of the disclosure.

The processing device 200 may include a processor 210, which may be a conventional proprietary data processor, memory, including random access memory (RAM), read only memory (ROM) and cache memory 212, and input/output adapter 222, a user interface adapter (UIA) 220, a communications interface adapter 224, and a multimedia controller 226.

The input/output (I/O) adapter 222 can be connected to, and control, disk drives 247, and removable storage devices 246, as well as other standard and proprietary I/O devices such as a printer (not shown). The user interface adapter 220 can be considered to be a specialized I/O adapter. The adapter 220 as illustrated is connected to a mouse and keyboard 240. In addition, the user interface adapter 220 may be connected to other devices capable of providing various types of user control, such as touch screen devices, track balls etc. (not shown).

The communications interface adapter 224 can be connected to a bridge 250 such as is associated with a local or a wide area network, and a modem 251. By connecting the system bus 202 to various communication devices, external access to information on a network can be achieved. The multimedia controller 226 will generally include a video graphics controller capable of displaying images upon the monitor 260, as well as providing audio to external components (not illustrated).

A graphical user interface module GUI 260 can be connected to browser 216 and both browser 216 and GUI 260 can control the features and contents provided on monitor 260. Browser 216 can also be connected to system bus 202 and can provide logic or instructions to facilitate a user-browser interaction associated with retrieval of current and archived information. Central processing unit 210, can execute functions and provide useful interaction tools to a user during searches over the Internet and during the submission of forms. One of the more specialized tools and operations that the device 200 can provide is archiving content including selectable links and data entered on web transmittable forms. In a particular embodiment such specialized functions and features can be provided by the interaction between archiver/comparer 214 and the browser 216.

In operation, a user operating the device 200 can utilize the GUI 260 to retrieve content from a remote server such as the servers illustrated in FIG. 1. In one embodiment the archiver/comparer 214 can store the retrieved content locally, in RAM/ROM/Cache 212 or on disk drive 247. When another retrieval of content occurs at a later time, utilizing a network address, the archiver/comparer 214 can compare the archived content of a website with the current content of the site and notify the user or query the user to see if the user wants to view an archived copy of the website. Thus, if content such as a link has been changed on a website or data on a form has been deleted and is not present on a current or real-time version of a web page, the user can elect to display the archive version, thereby returning to a previously displayed content as desired.

The archiver/comparer 214 can automatically store the content of a displayed web page locally in RAM/ROM/Cache 212, the disk drive 247 or in some form of non-volatile memory after the web page has been displayed to the user. For example, after the content of a web page is received by the device 200 via communications I/F 224 and is displayed by the GUI 260, a user may attempt to "refresh" the displayed contents utilizing the browser 216; and such a command will request another download from a remote server. Prior to execution of the refresh command, the browser 216 can activate the archiver/comparer 214 to archive a "snapshot" of the contents of the displayed web page before the contents of the web page are discarded or prior to the new download. If the contents of the newly downloaded webpage are different than the original webpage, the original contents can be restored on the GUI 260 via a user-browser interaction. In one embodiment, the archiver/comparer 214 can determine if the web page has changed and can display a list of archived web pages via the GUI 260. If the user desires, the user can select archived pages to be displayed from the list of archived pages.

In one embodiment the user can be provided with a decision tool via the browser 216 that allows a user to view archived versions of web pages before a new web page is displayed in response to a user command such as a refresh, go, retrieve, forward, or back command. As stated above, many news related sites store articles in files that are accessible from selectable links for long periods of time; however the actual link on a front page of the news web site may only be present for a portion of a day due to other breaking news that is deemed more important by editors of the website.

Figure 3:
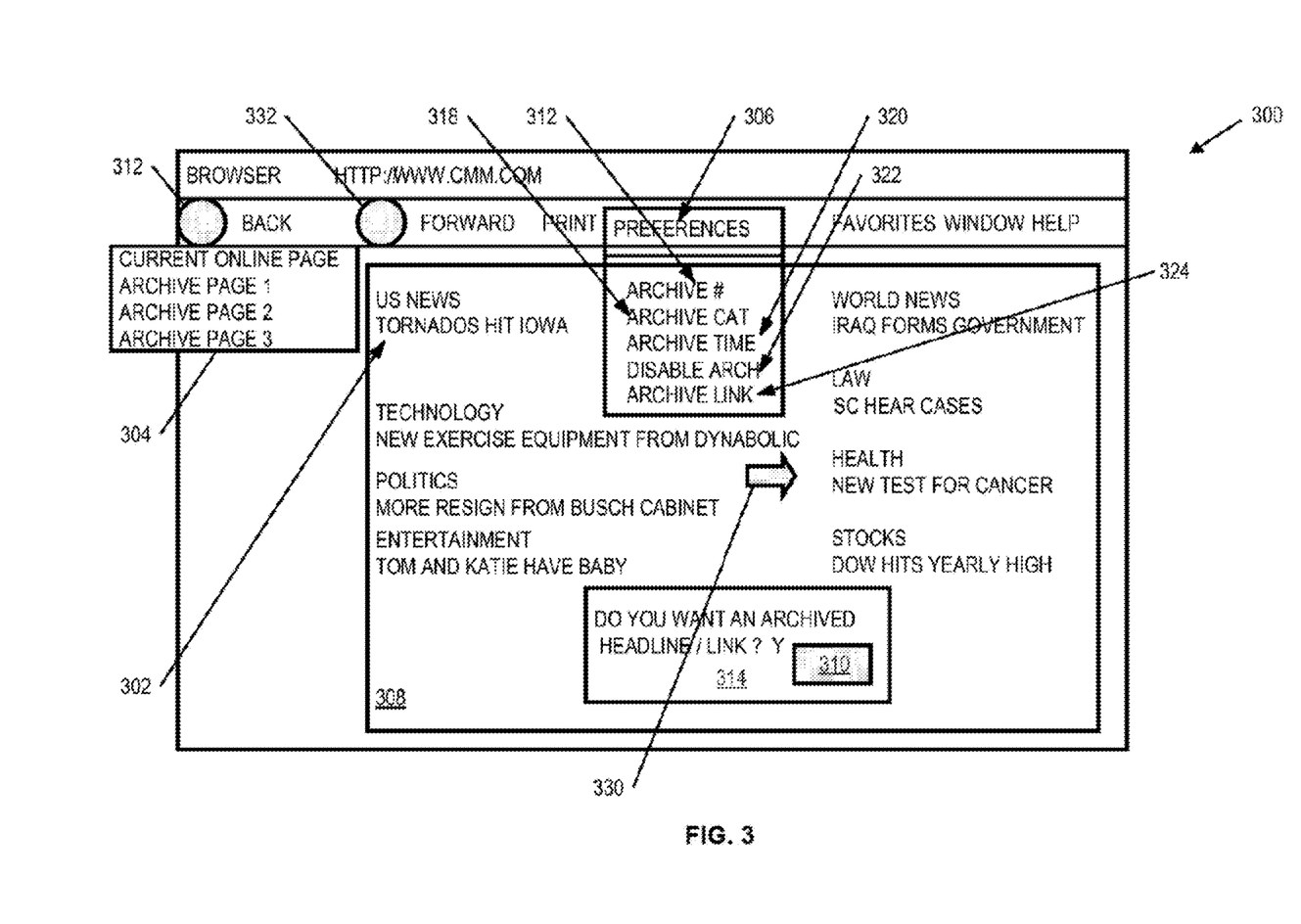
FIG. 3 depicts a graphical user interface configured to facilitate archiving information and links in a browser environment.

Referring to FIG. 3, a graphical user interface (GUI) of a browser 300 that can facilitate a user-browser interaction is illustrated. In this embodiment, different news classifications are displayed such as US NEWS 302, WORLD NEWS, and TECHNOLOGY. These different classifications or categories can each provide a selectable link, wherein placing a pointer 330 or a cursor over a headline or a classification and depressing a mouse button can retrieve additional information such as an entire article that supports the headline.

In accordance with a specific embodiment, assume that a previous version of the displayed front page 308 had been displayed to the user a few days ago, and moments earlier a user has selected a control command from the browser 300 that activated the browser 300 to create the current display (such a command or request could have been made using the back button 312, the forward button 332 or many other buttons). Prior to such a request, the browser 300 can archive a previous version of the web page. After receipt of the current content of the web site, the browser 300 can compare the archived version to the current version. If the current version is different than the archived version, the browser 300 may prompt the user with pop-up query window 314 to determine if the user wants to view the archived content. If the user wants to view the archived version, the user can select selectable button 310 and the browser 300 can display the archived version.

Any change of state or command in the user-browser interaction can activate the archive and compare functions, prompt the user with questions regarding the user's desires, and provide a way to accept user input. In a particular embodiment, the user can be provided with multiple selections such as those provided in pull down window 304. In pull down window 304, the user can elect to display the current on-line page, archive page 1, archive page 2, archive page 3 etc. Selections in pull down menu 304 can provide a selectable link to the archived web pages or the web page that is currently displayed. In other embodiments, the pull down window 304 and the pop-up window 314 can be provided prior to the retrieval or display of the content currently stored by the remotely located server (not shown).

A user can also set preferences regarding how archived content can be handled or processed by the browser 300. For example, in the illustrated embodiment a user has selected the preferences button 306 and a preferences sub-window has been activated or "pulled down." In the preferences sub-window, a user can select preferences for the number of archives for a given web page by selecting Archive #312 and entering a number. The user can also elect to categorize the archives by selecting Archive Cat 318, possibly preserving the archives in long term storage such as non-volatile storage for an indefinite period of time. The user can also select a time period for which to archive web page content by selecting Archive time 320 and entering a time such as 30 days, 60 days etc. In yet another embodiment, the user can select disable arch. 322 to disable the archive function entirely or to disable a portion of the archive function such that a user would never be prompted for any archived content. In other embodiments, the user can elect to archive and compare specific links, headlines on a web page or portions of a web page by selecting archive link 324. Thus, a user can define portions of content on a web page that the user wants to "monitor" and only these portions can be archived and reviewed for changes with all other changes being ignored during the compare function.

One embodiment for marking pages to be archived can include a user highlighting a set of links with a mouse and then invoking a command from a pop-up menu after a right mouse button selection to watch for changes exclusively to the highlighted links. When the browser 300 detects changes to the set of links the browser can archive the older version of the webpage.

The archive web pages could also have preference regarding how many versions of a web page should be archived and available via pull down window 304. For example, the user may select that four archived versions of a particular website are to be archived and when a sixth version occurs the oldest version would be dropped from the dynamic list. In a browser environment some pages automatically refresh after some predefined time interval. In one embodiment, the browser 300 could detect this action in HTML code by reading a META tag or by reading a series of META tags. When a change is detected the browser can automatically archive the web page at predetermined time intervals. The time period between saves could also be a preconfigured time interval set by a preferences entry.

The browser/GUI 300 could also provide a rules based archive policy wherein the browser/GUI 300 would archive single links when a new link replaces an old link. Such a new link could be identified by a new anchor element in the HTML code. For example, as opposed to taking a blind snapshot at each "META refresh," ordinary "diff" techniques could also be utilized to detect content changes. Another embodiment could allow the user to manually tag sections of web pages or portions of web pages in response to a user input to tag sections for viewing at a later date. For example, a user may only be interested in Technology and Finance news or categories but may not be interested in Politics. Thus, whenever content is updated under the Technology and Finance categories, a portion of the web page or specific links of the web page would be archived, but the entire page would not be archived. If the Politics heading or link was changed, no archive feature would occur and no notice would be provided to the user. In addition to archiving links to news articles and archiving submitted forms, the present disclosure can facilitate additional functions such as functions for obtaining stock market information and trading, banking, shopping, shipping, and communicating each of which may have content that can change over time.

In accordance with the present disclosure, the user's machine can detect that a newly retrieved web page is different than a previously retrieved web page and prompt the user to determine if the user wants the archived or the newly retrieved version of the web page displayed. Assuming the user still wants to view an article which does not have a link currently displayed on the website the user can request to display the archived version of the website content. When it is displayed, the user can select the link that had been removed to retrieve the desired article.

Figure 4:
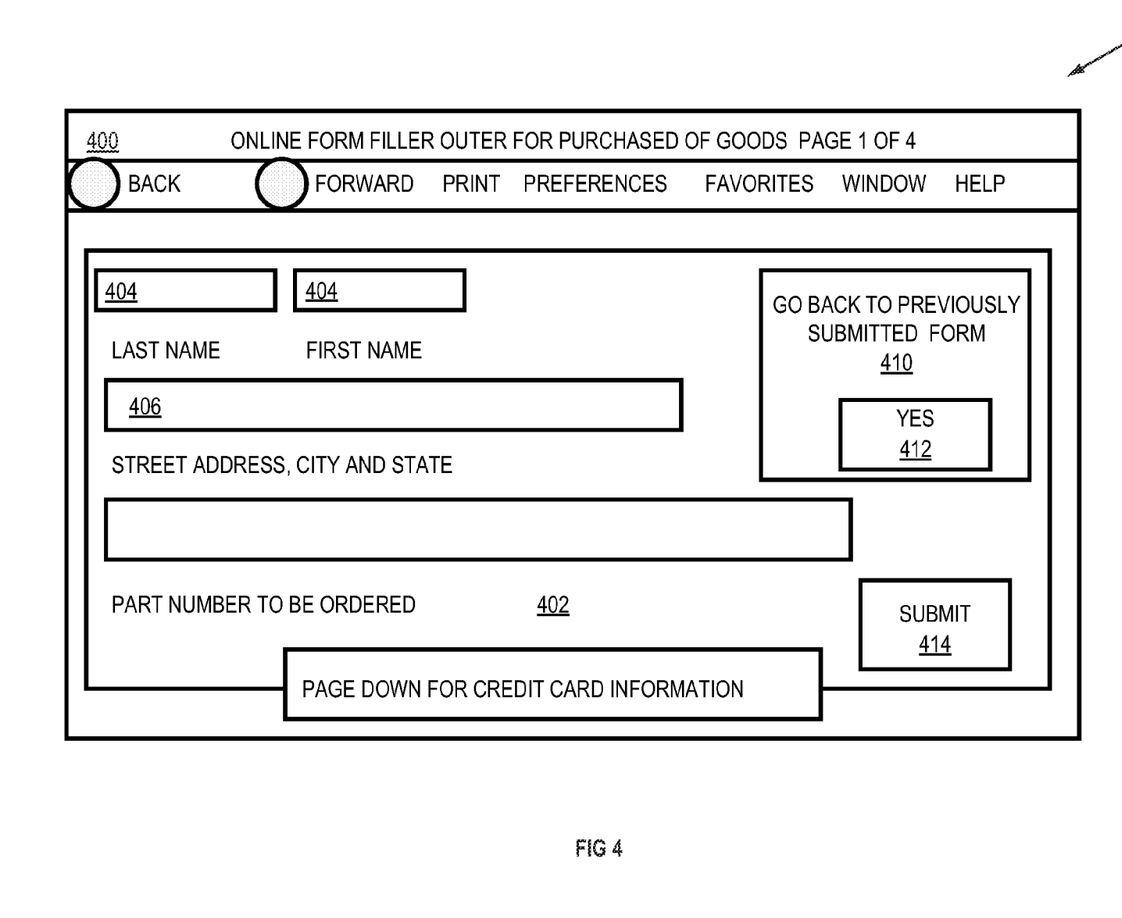
FIG. 4 depicts a graphical user interface configured to facilitate archiving information on a form in a browser environment.

Turning now to FIG. 4, an illustration of a GUI of a browser 400 that can assist in submitting information to a server over a network is provided. In the illustrated embodiment, a user, via the browser 400, has retrieved a web page 402 that contains a form with fields such as fields 404 and 406 that can be filled out or can receive data entries from a user. A user can enter data into the fields of the form, then select a submit button 414 to transmit the information entered by the user over a communications network as described above with reference to FIG. 1. Often, during such a submission, a problem can arise wherein data is lost. For example, assume fields 404 and 406 were not "perfectly" filled out when submitted via a previous screen and blank fields 404 and 406 were returned by the server. This can be frustrating to a user who has just spent considerable time filling out the form while reading paper documents during such a procedure to get information.

In the illustrated embodiment, Last name field 404 and Street address field 406 were previously filled out and then submitted to a server which returned a blank form. Thus, prior to the display of the current page, a user may have completely filled out the fields 404 and 406 as well as many other fields of the form and then selected the submit button 414. In frustration a user will often attempt to activate a back button on the browser 400 in an attempt to re-acquire or re-display the submitted information.

In accordance with the present disclosure, the browser 400 can store or archive a previous, or filled-out version of the form prior to its submission responsive to a user selection of the submit button 414. When the submit button 414 is selected by the user and a webpage or form is returned by the server, the browser 400 can compare the returned version of the form to the submitted or archived version of the form. If there is a difference in the fields that have been filled out, the browser 400 can provide a pop up window 410 that queries the user to determine if the user wants to view the previously submitted form. Such a decision can be confirmed by activation of the "Yes" button 412.

In one embodiment, the browser 400 can determine that a form is being retrieved, filled out and submitted due to specific tags in the HTML data. For example, the HTML data may contain a tag defined as a "form" tag. Knowing that a form type tag exists in combination with a user selection of a "submit" button 414 can trigger the browser 400 to archive the form and its contents locally before the data is submitted.

In one example, a software program can be provided wherein a user can retrieve a form such as an order form or an airline or hotel reservation form. When the user submits the form, an archive copy of the form can be stored locally on the user's machine based solely on selection of a submit button. Thus, if the transmission does not work or the server processing the form deletes or corrupts the data in the form, then the browser 400 can ask the user if the user wants the filled out form to be displayed or if the user wants the returned/blanked form that was returned by the server to be displayed. Most of the time, the user would not want to re-enter all the data so the user would likely elect to display the page that had already been filled out.

Each software program described herein may be operated on any type of computer, such as personal computer, server, etc. Any programs may be contained on a variety of media. Illustrative media include, but are not limited to: (i) non-writable storage media (e.g., read-only memory devices within a computer such as CD-ROM disks readable by a CD-ROM drive); and (ii) writable storage media (e.g., floppy disks within a diskette drive or hard-disk drive). Such media, when storing computer-readable instructions that direct the functions of the present invention, represent embodiments of the present invention.

Figure 5:
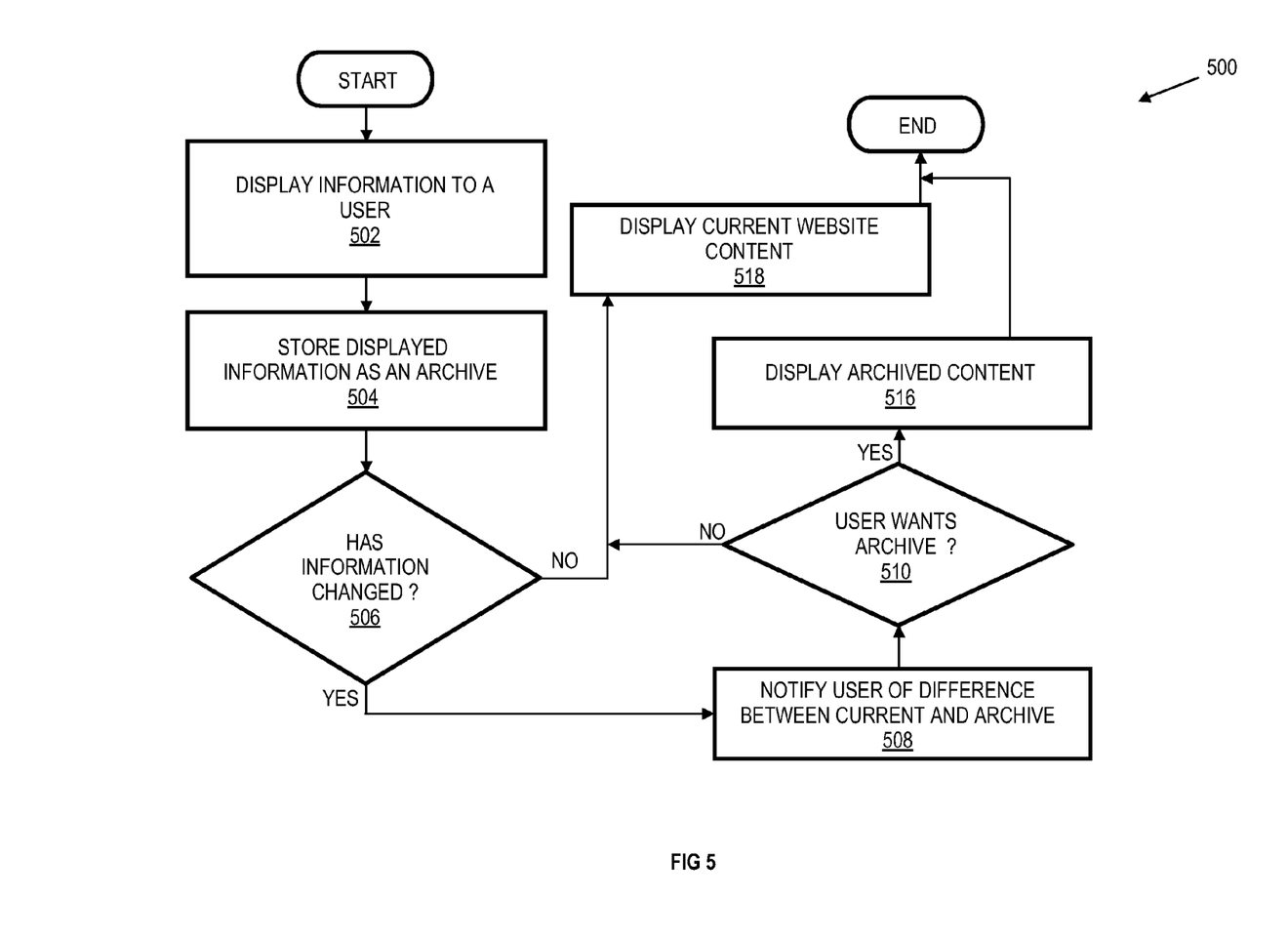
FIG. 5 depicts a flow chart depicting a one method for archiving information and links.

Referring to FIG. 5, a flow chart 500 depicting a method for archiving web-based content is provided. As illustrated by block 502, information can be displayed to a user. The information can be displayed in response to a user request for information via a browser. The browser can facilitate storing the displayed information in an archive file locally. When a user selects a button that will command the browser to change what is displayed, for example selecting a feature that retrieves a web page, the browser can recognize such a request and determine if the retrieved webpage is different than an archived page having the same address. In one embodiment, a simple revision date provided by the website can be utilized to determine if the archived version is different that the currently available version.

When it is determined that the information has not changed, at decision block 506 the current website information can be displayed as illustrated in block 518 and the process can end thereafter. On the other hand, when it has been determined that the content of the web page has changed by the compare function, at decision block 506, then the user can be notified that there is a difference between the web pages as illustrated by block 508.

This compare feature can be activated by many different user-browser interactions such as selection of the back button, a forward button, a favorites link, a "Go" selection or any other page display function provided by a browser. When a new or current web page is displayed or prepared for display, the browser can compare the retrieved contents to the archived contents and query a user to determine whether the user wants the new contents or the archived contents. Such a feature can greatly reduce the chance that a user will lose the ability to locate or access content that has disappeared from a web-page because it is no longer the "most" important story in its category.

As illustrated by decision block 510, the user can be queried if the user wants to view the archived web page. If the user does not want to display the archived information then the method can proceed to display the current website information as illustrated by 518 and the process can end thereafter. If the user wants to view the archive content it can be displayed as illustrated in block 516 and the process can end thereafter.

In one embodiment, the user query can include a selection window that allows a user to select from numerous archived web pages. The user could be provided with a selectable tab or button for each archived page. In another configuration, the browser could also provide a small pull down menu when a selection button such as a back button is selected and the pull down menu could list the last 5 archived websites having a specific address. Selection buttons such as a back and forward button can be controlled by the browser/GUI and may be used to provide undo and redo functionality for the disclosed stateful server applications, wherein processes can store one or more preceding events in a given sequence of interactions with a user, another computer or program, a device, or other outside element and the functionality may be implemented using invisible pages loaded in the browser. If it is determined that undo or redo cannot be performed, the client may continue to display the application page optionally with a message to the user that such a process was unachievable.

The browser can provide a mechanism for determining which files or web pages should be cached by the web browser and which will not be cached. An extension to the file name could be appended to the locally cached webpage wherein the extension could include a date and a time stamp. In accordance with the present disclosure, the archiving system can be client based or web browser based and not server based so that if the server hosting the caching services has an outage, the client can still locate the desired information via links on the archived web page.

In an alternate embodiment a server based cached system can store multiple versions of "time sequenced" web pages wherein the display and control arrangements described herein can download multiple versions of the same webpage and perform the compare function locally. Such a procedure could have similar operation to the locally cached embodiment and such operation could be transparent to a user. In accordance with one embodiment of the present disclosure, an archived version of a web page or a form being filled out can be stored locally. After a predetermined amount of time or a degree of inactivity/non-selection, the archived files can be discarded according to user preferences.

In another embodiment the method described above with reference to FIG. 5 could apply to retrieving, filling out, archiving and submitting forms over a network. For example in block 502, a form can be displayed to a user, and the user can fill out the form utilizing a browser. The information from a filled out form can be stored locally responsive to the detected user interaction as illustrated by block 504. At decision block 506, it can be determined if the newly displayed content is different than the previously displayed content. If the information in the returned form of the currently displayed screen is substantially the same as the content of the archived form, then the content returned from the current website can be displayed as illustrated by block 518.

When it is determined that the newly displayed page is different than the archived page, the user can be notified that a difference exists as illustrated by block 508. The user can be queried to determine if the user wants to display the archived content of the form at block 508. If the user does not want to view the archived copy, the current web page content can be displayed as illustrated by block 518. When a user wants to display the archived copy at block 510 then the archived copy can be displayed as illustrated by block 516 and the process can end thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can store the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods, systems, and media that allow a user to select between current and archived content in a data retrieval system such as a user-browser interface. It is understood that the form of the invention shown and described in the detailed description and the drawings are to be taken merely as examples. It is intended that the following claims be interpreted broadly to embrace all the variations of the example embodiments disclosed.

What is claimed is:

1. A method comprising:
    downloading, by a browser executing on a client machine, a first content of a web page from a server at a network address in response to a first instruction to open the web page at the network address;
    displaying, by the browser, the first content of the web page;
    providing, by the browser, a selectable feature for archiving one or more user-selected links on the web page in the first content of the web page in response to a user input;
    storing, by the browser, the network address of the web page and an archive copy of the one or more user-selected links in the first content of the web page on the client machine;
    receiving, by the browser, a second instruction to open the web page when the web page is no longer being displayed;
    downloading, by the browser, in response to the receiving of the second instruction to open the web page, a second content of the web page from the server, wherein the second content is different from the first content;
    storing, by the browser, an archive copy of the second content of the web page on the client machine;
    providing, in a user interface of the browser, a selectable feature to display the second content or the one or more user-selected links in the first content; and
    responding to an input to the selectable feature to display the second content or the one or more user-selected links in the first content by displaying either the second content of the web page from the archive copy of the second content stored by the browser executing on the client machine or the one or more user-selected links in the first content of the web page from the archive copy of the one or more user-selected links in the first content stored by the browser executing on the client machine.

2. The method of claim 1, further comprising storing the one or more user-selected links in the first content and determining that links in the second content that correspond to the one or more user-selected links in the first content are different than the one or more user-selected links in the first content.

3. The method of claim 1, further comprising storing user-entered data and adding the user-entered data to the first content.

4. The method of claim 1, wherein displaying the first content comprises displaying the first content utilizing a graphical user interface of the browser.

5. The method of claim 1, wherein the storing of the archive copy of the second content is performed in response to an activation of a go back instruction.

6. The method of claim 1, wherein the storing of the archive copy of the second content is performed in response to an activation of a submit form instruction.

7. The method of claim 1, further comprising providing a selectable feature for selecting a number of archive copies of the web page to store.

8. The method of claim 1, further comprising providing a selectable feature for categorizing archive copies of the web page.

9. The method of claim 1, further comprising providing a user-selectable feature for selecting a time period for which to store archive copies of the web page.

10. The method of claim 1, wherein the selectable feature for archiving one or more user-selected links is further enabled to archive one or more additional contents linked by the one or more user-selected links on the web page in the first content of the web page.

11. The method of claim 1, wherein the selectable feature for archiving one or more user-selected links is further enabled to receive the user input such that the user input comprises a mouse input to select one or more links on the web page as the one or more user-selected links, and a selection input to indicate the one or more user-selected links for archiving.

12. The method of claim 1, wherein the selectable feature for archiving one or more user-selected links is further enabled to archive one or more user-selected portions of the first content.

13. The method of claim 1, further comprising:
    storing the one or more user-selected links on the web page in the first content of the web page;
    monitoring the one or more user-selected links in the first content of the web page for changes; and
    in response to detecting the changes to the one or more user-selected links in the first content of the web page, archiving the one or more user-selected links as part of archiving the first content of the web page.

14. A computer program product for providing archived content to a user, the computer program product comprising:
    a computer usable storage device having computer usable program code embodied therewith, wherein the computer usable program code is configured to:
        download, by a browser executing on a client machine, a first content of a web page from a server at a network address in response to a first instruction to open the web page at the network address;
        display, by the browser, the first content of the web page;
        provide, by the browser, a selectable feature for archiving one or more user-selected links on the web page in the first content of the web page in response to a user input;
        store, by the browser, the network address of the web page and an archive copy of the one or more user-selected links in the first content of the web page on the client machine;
        receive, by the browser, a second instruction to open the web page when the web page is no longer being displayed;
        download, by the browser, in response to receiving the second instruction to open the web page, a second content of the web page from the server, wherein the second content is different from the first content;
        provide, in a user interface of the browser, a selectable feature to display the second content or the one or more user-selected links in the first content of the web page; and
        respond to an input to the selectable feature to display the second content or the one or more user-selected links in the first content by displaying either the second content of the web page from the archive copy of the second content stored by the browser executing on the client machine or the one or more user-selected links in the first content from the archive copy of the one or more user-selected links in the first content stored by the browser executing on the client machine.

15. The computer program product of claim 14, wherein the computer usable program code is further configured to store user-entered data and add the user-entered data to the first content.

16. A computer system for displaying archived web pages comprising:

one or more processors and a computer-readable storage device; and a plurality of program instructions stored on the computer-readable storage device for execution by at least one of the one or more processors, the plurality of program instructions comprising:

program instructions to download, on a client machine upon which a browser executes, a first content of a web page from a server at a network address in response to receiving a first instruction to open the web page at the network address;

program instructions to display the first content of the web page;

program instructions to provide, by the browser, a selectable feature for archiving one or more user-selected links on the web page in the first content of the web page in response to a user input;

program instructions to download a second content of the web page from the server in response to receiving a second instruction to open the web page at the network address, wherein the second content is different from the first content;

program instructions to, in response to a determination that the second content of the web page is different from the first content of the web page, display a prompt in a graphical user interface of the browser, wherein the prompt prompts a user to determine whether to display the second content or the one or more user-selected links in the first content; and program instructions to display, responsive to a user response to the prompt, either the one or more user-selected links in the first content from an archive copy of the one or more user-selected links in the first content stored on the client machine by the browser or the second content from an archive copy of the second content stored on the client machine by the browser.

17. The system of claim 16, wherein the program instructions to display the prompt in the graphical user interface of the browser display the prompt based in part on a predetermined preference.

18. The system of claim 16, wherein the program instructions to display the prompt display a selectable link.

19. The system of claim 16, wherein the plurality of program instructions stored on the computer-readable storage medium for execution by at least one of the one or more processors further comprise program instructions to store the downloaded first content and the downloaded second content in a cache file.

20. The system of claim 16, wherein the plurality of program instructions stored on the computer-readable storage medium for execution by at least one of the one or more processors further comprise program instructions to accept a user selection in the graphical user interface and program instructions to send a download request.

21. The system of claim 16, wherein the plurality of program instructions stored on the computer-readable storage medium for execution by at least one of the one or more processors further comprise program instructions to provide a pop-up window with a selectable feature in response to a user input.

* * * * *